United States Patent [19]

Riser et al.

[11] Patent Number: 5,911,020
[45] Date of Patent: Jun. 8, 1999

[54] BI-PLANAR MULTIPORT ILLUMINATOR OPTIC DESIGN FOR LIGHT GUIDES

[75] Inventors: Andrew P. Riser, Capistrano Beach; Ronald F. Mathis, Ramona, both of Calif.

[73] Assignee: Remote Source Lighting International Inc., San Juan Capistrano, Calif.

[21] Appl. No.: 08/792,563

[22] Filed: Jan. 31, 1997

Related U.S. Application Data

[63] Continuation-in-part of application No. 08/374,163, Jan. 17, 1995, Pat. No. 5,559,911, application No. 08/459,613, Jun. 2, 1995, Pat. No. 5,706,376, application No. 08/599,970, Feb. 14, 1996, application No. 08/645,324, May 13, 1996, application No. 08/645,325, May 13, 1996, Pat. No. 5,708,737, application No. 08/645,326, May 13, 1996, Pat. No. 5,661,828, application No. 08/645,327, May 13, 1996, Pat. No. 5,682,448, application No. 08/743,426, Nov. 1, 1996, and application No. 08/742,846, Nov. 1, 1996, abandoned.

[51] Int. Cl.⁶ .................................................... G02B 6/32
[52] U.S. Cl. ............................ 385/33; 385/31; 385/147; 385/901
[58] Field of Search ................................ 385/31, 33, 47, 385/34, 125, 133, 115, 116, 119, 901, 147; 359/838, 839, 868; 362/32, 341, 347

[56] References Cited

U.S. PATENT DOCUMENTS

| | | | |
|---|---|---|---|
| 4,050,784 | 9/1977 | Kobayashi | 385/34 X |
| 4,302,069 | 11/1981 | Niemi | 362/32 X |
| 4,389,698 | 6/1983 | Cibie | 362/32 |
| 4,396,834 | 8/1983 | Appel et al. | 250/216 |
| 4,704,660 | 11/1987 | Robbins | 362/32 |
| 4,727,380 | 2/1988 | Miura et al. | 346/108 |
| 4,811,171 | 3/1989 | Viola | 362/32 |
| 4,811,172 | 3/1989 | Davenport et al. | 362/61 |
| 4,816,975 | 3/1989 | Bahnemann et al. | 362/308 |
| 4,851,969 | 7/1989 | Davenport et al. | 362/61 X |
| 4,868,718 | 9/1989 | Davenport et al. | 362/32 |
| 4,912,605 | 3/1990 | Whitehead | 362/32 |
| 4,949,227 | 8/1990 | Finch et al. | 362/61 |
| 4,958,263 | 9/1990 | Davenport et al. | 362/32 |
| 4,961,622 | 10/1990 | Gorman et al. | 385/33 X |
| 5,222,793 | 6/1993 | Davenport et al. | 385/32 |
| 5,259,056 | 11/1993 | Davenport et al. | 385/115 |
| 5,271,077 | 12/1993 | Brockman et al. | 385/31 |
| 5,367,590 | 11/1994 | Davenport et al. | 385/901 X |
| 5,377,287 | 12/1994 | Lee et al. | 385/31 |
| 5,390,265 | 2/1995 | Jiao | 385/15 |
| 5,396,571 | 3/1995 | Saadatmanesh et al. | 385/33 |
| 5,414,600 | 5/1995 | Strobl et al. | 362/32 |
| 5,416,669 | 5/1995 | Kato et al. | 362/32 |
| 5,706,376 | 1/1998 | Rykowski et al. | 385/31 |

FOREIGN PATENT DOCUMENTS

| | | | |
|---|---|---|---|
| 2623231 | 12/1977 | Germany | 362/32 X |
| 2651283 | 5/1978 | Germany | 362/32 X |
| 4309389 | 9/1993 | Germany | 362/32 X |
| 63291012 | 11/1988 | Japan | 385/33 |
| 6174963 | 6/1994 | Japan | 385/24 |
| 2098311 | 11/1982 | United Kingdom | 385/901 X |
| 9009607 | 8/1990 | WIPO | 362/32 X |

*Primary Examiner*—Brian Healy
*Attorney, Agent, or Firm*—Stout, Uxa, Buyan & Mullins, LLP; Donald E. Stout

[57] ABSTRACT

The inventive system, which is used in transmitting illumination from a central source to a variety of remote locations, efficiently couples the light originating from a lamp, or similar source, into a multiplicity of flexible macroscopic fibers. The combination of the several elements of the inventive system results in a very efficient transfer of the energy of the light source to the fibers. Light from the lamp is fed to a ring-shaped configuration of ports, with each port having one or more flexible macroscopic fibers connected thereto.

16 Claims, 5 Drawing Sheets

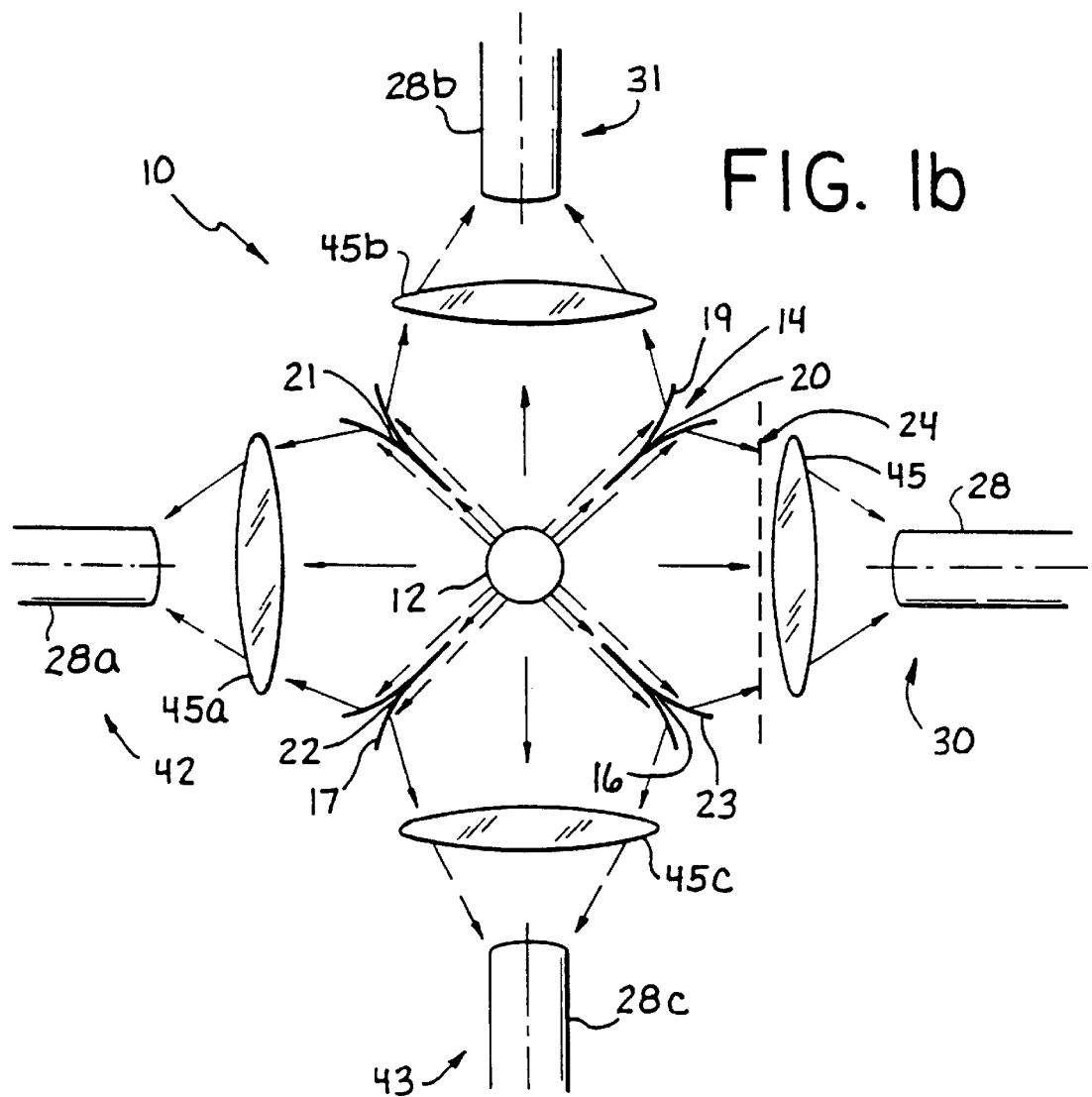

BI-PLANAR MULTIPORT ILLUMINATOR OPTIC DESIGN FOR LIGHT GUIDES

This application is a continuation-in-part of U.S. Application Ser. No. 08/374,163 filed on Jan. 17, 1995 and entitled OPTICAL FIBER COUPLER USING SEGMENTED LENSES, which issued into U.S. Pat. No. 5,559,911 on Sep. 24, 1996; U.S. application Ser. No. 08/459,613 filed on Jun. 2, 1995, now U.S. Pat. No. 5,706,376, and entitled MULTIPORT ILLUMINATOR FOR MACROFIBERS; U.S. application Ser. No. 08/599,970 filed on Feb. 14, 1996, pending, and entitled OPTICAL COUPLER; U.S. application Ser. No. 08/645,324, filed on May 13, 1996, pending, and entitled MULTIPORT ILLUMINATOR OPTIC DESIGN FOR MACRO-FIBERS; U.S. application Ser. No. 08/645,325, filed on May 13, 1996, now U.S. Pat. No. 5,708,737 and entitled MULTIPORT ILLUMINATOR MECHANICAL DESIGN FOR MACRO-FIBERS; U.S. application Ser. No. 08/645,326, filed on May 13, 1996, now U.S. Pat. No. 5,661,828, and entitled REFLECTOR FOR ILLUMINATION SYSTEM; U.S. application Ser. No. 08/645,327, filed on May 13, 1996, now U.S. Pat. No. 5,682,448, and entitled REFLECTOR AND ILLUMINATION SYSTEM; U.S. application Ser. No. 08/743,426, filed on Nov. 1, 1996, pending, and entitled MULTIPORT ILLUMINATOR FOR MACRO-FIBERS; and U.S. Application Ser. No. 08/742,846, filed on Nov. 1, 1996, abandoned, and entitled REFLECTOR AND ILLUMINATION SYSTEM, all nine of which are commonly assigned and the contents of which are expressly incorporated herein by reference. This application is related to U.S. application Ser. No. 08/789,972, filed on Jan. 31, 1997, pending, and entitled MULTIPORT ILLUMINATOR OPTIC DESIGN; and U.S. application Ser. No. 08/789,965 filed on Jan. 31, 1997, pending, and entitled SPHERICAL MULTIPORT ILLUMINATOR OPTIC DESIGN, both of which are commonly assigned and the contents of which are expressly incorporated herein by reference.

BACKGROUND OF THE INVENTION

1. Field of the Invention

The present invention relates generally to reflectors and, more particularly, to reflectors for coupling light from a light source into one or more light guides.

2. Description of Related Art

Large diameter fiber optics, often referred to as "flexible light guides", are well known in the art, and typically comprise a single, solid core fiber which is surrounded by a cladding layer and a sheath or shielding layer. The core is the portion of a light guide which transmits light, and typically has a diameter of about 2 to 12 mm. It is formed of a very soft, semi-liquid plastic material, such as OPTIFLEX®, which is manufactured by Rohm & Haas Corporation, of Philadelphia, Pa. The cladding layer typically comprises polytetrafluoroethylene (PTFE or TEFLON®), or the like, while the outer sheath is fabricated of a material such as polyvinylchloride (PVC). Unlike small diameter light guides, which are typically used to transmit information in relatively complex control systems, these large diameter "light guides" are typically employed in a variety of illumination systems where direct lighting is difficult to maintain, dangerous, or subject to vandalism. Examples include architectural lighting, display cases, pools and spas (to eliminate electrical connections near water), hazardous material zones (to eliminate the need for sealed lighting), and jail cells. Large diameter light guides are particularly advantageous in that only a single centralized illumination system must be maintained, rather than a plurality of individual lights.

There are problems, however, in implementing state of the art light guide illumination systems because of the difficulty of illuminating a plurality of light guides from a single illumination source, as is discussed in related application Ser. No. 08/374,163, now U.S. Pat. No. 5,539,911. Early prior art systems attempted to bundle the light guides as closely as possible in order to maximize efficiency and to ensure the maximum ratio of core area (the part of each light guide which actually transmits light) to total area. The light guides are round and thus have a great deal of space between them due in part to the cladding and shielding layers. All of the light not falling upon the cores is wasted, and becomes an efficiency loss, since it will not be transmitted by the light guides. Additionally, packing the light guides closely together creates problems such as mechanical difficulties in configuring and accommodating the illumination system and difficulties encountered in attempting to replace one of the individual bundled light guides. This design also typically results in color variation between light guides unless techniques are specifically employed to prevent this problem.

One prior art solution to this problem has been to eliminate the sheathing and cladding layers about each light guide, in order to reduce the area across the bundled array of light guides which does not transmit light. However, there is still a packing factor problem because the light guides are round, and there are other physical disadvantages in eliminating those layers. Thus, this solution is unsatisfactory for most applications.

A number of prior art approaches use reflectors for focussing light from a source of illumination into one or more light guides. U.S. Pat. No. 5,222,793 and U.S. Pat. No. 5,259,056, both to Davenport et al., disclose lighting systems which use a single reflector assembly for illuminating light transmissive elements. U.S. Pat. No. 5,396,571 to Saadatmanesh et al. discloses a multi-segmented lens which divides light from a light beam into four separate beams, each of which is focussed onto a separate optical fiber. U.S. Pat. No. 4,912,605 to Whitehead discloses an electric light source mounted between two reflectors, each of which directs light into a corresponding light guide. U.S. Pat. No. 5,469,337 to Cassarly et al. discloses a light source and a plurality of curved reflectors for focussing light into lenses and then into a plurality of light guides. The use of reflectors and multi-segmented lenses by the prior art for coupling light into light guides has represented some advancement over the prior art bundled light guides, but the need for a proper and efficient coupling of a light source to a plurality of light guides still remains.

In many cases the proper and efficient coupling of a light source to a plurality of light guides changes according to the particular light source being used. Modern electrodeless sulfur lamps, for example, which are electrodeless and burn very brightly, can be too powerful for coupling to only one or two light guides. If an inefficient coupling is used the effective luminosity may be reduced for a better match with the light guides, but the cost of running the system will then be unreasonably high as a result of the wasted energy. Efficiency is still desired so that the energy associated with generating the high luminosity of such a bright illumination source can be fully utilized.

Another problem associated with prior art designs is the large number of optical components associated with these designs. Reducing the number of parts of any optical design would appear to be advantageous to any system.

SUMMARY OF THE INVENTION

This invention efficiently couples the light originating from a light source, such as a double-ended metal halide lamp, into a multiplicity of light guides. Such a system is to be used in transmitting illumination from a central source to a variety of remote locations. The combination of the several elements of the inventive system results in a very efficient transfer of the energy of the light source to the light guides.

According to an aspect of the present invention, a light guide illumination system includes a first curved reflector generally lying in a first plane, and a second curved reflector generally lying in a second plane, which is substantially parallel to the first plane. A light source is disposed between the first curved reflector and the second curved reflector. The first and second curved reflectors generally have circular perimeters, and have approximately planar shapes with slight curvatures. The light guide illumination system further includes a plurality of focussing lenses disposed around the first and second curved reflectors. These focussing lenses are adapted for focussing light from both the light source and the curved reflectors in a generally radially outwardly direction from the light source. The ring of focussing lenses has a height and a perimeter. According to one aspect of the present invention, the ring of focussing lenses has a plurality of focussing lenses, measured along the height, at any point along the perimeter.

The present invention, together with additional features and advantages thereof, may best be understood by reference to the following description taken in connection with the accompanying illustrative drawings.

BRIEF DESCRIPTION OF THE DRAWINGS

FIGS. 1a and 1b are schematic top views of optical systems according to the present invention;

FIG. 2 is an enlarged schematic view of the lamp and right portion of the quad reflector illustrated in FIG. 1a;

FIG. 3 is a schematic side view illustrating the multi-sector lens which forms a part of the optical system shown in FIG. 1a;

DETAILED DESCRIPTION OF THE PREFERRED EMBODIMENT

Figure 1A:
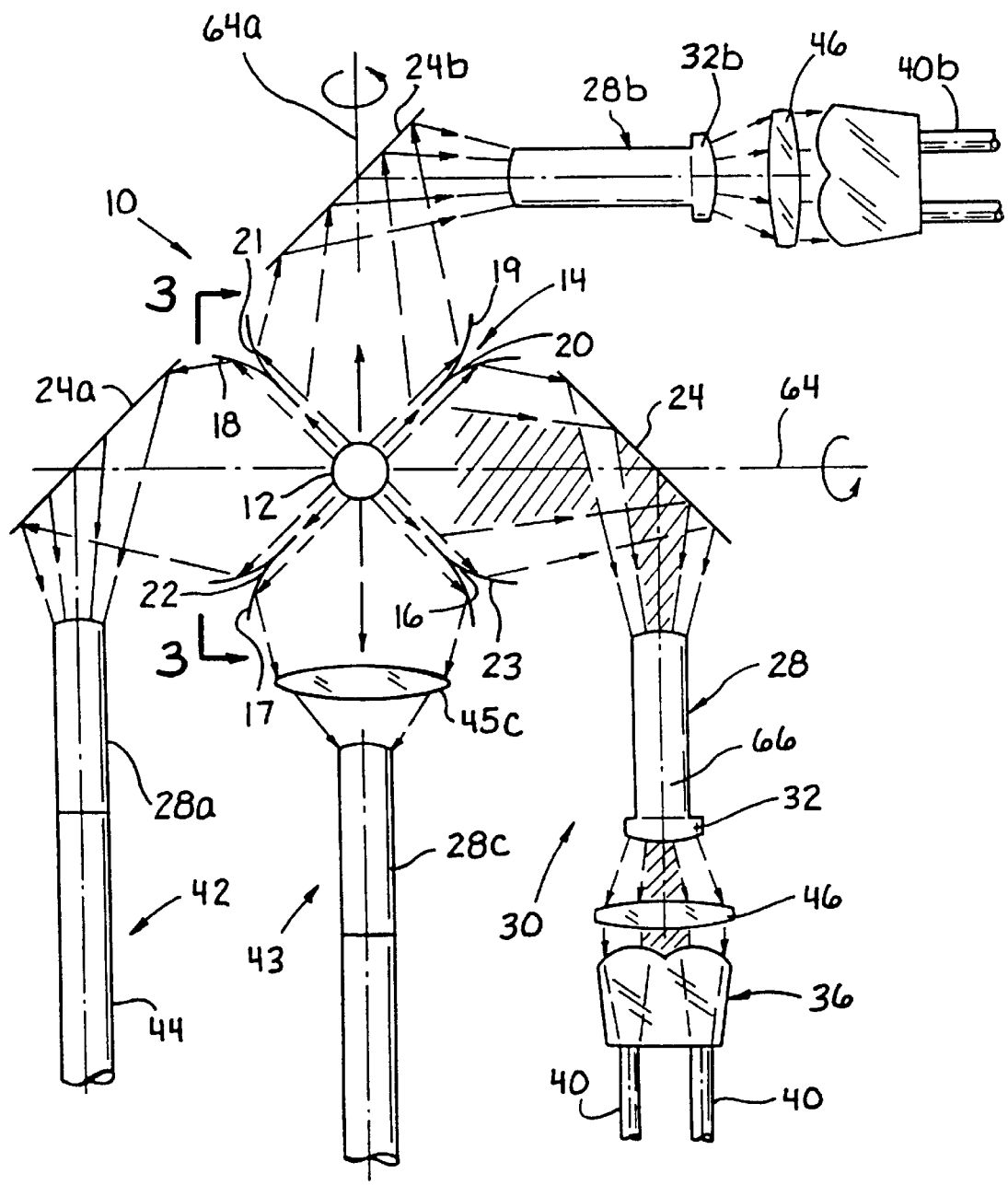

Referring now more particularly to the drawings, an optical system 10 is illustrated including a compact light source 12, which may comprise an arc lamp or similar source. The light source 12 is placed at the focus of a quad-curved reflector 14, which comprises four reflector portions 16, 17, 18, and 19 disposed in back-to-back fashion. In each of the reflector portions 16–19, the center or vertex region of the reflector has been removed, as illustrated. The four reflector portions 16–19 can be seen in the figure joined at intersection points 20–23.

Light is emitted from the light source 12. As presently preferred, the light source 12 comprises a metal halide lamp, model BA 575 GS, which is manufactured by Sylvania. This metal halide lamp preferably comprises a 575 watt lamp, which is adapted for emitting approximately 49,000 lumens at a color temperature of between 4,000 and 6,000 degrees Kelvin. The metal halide lamp comprises a first illuminated end and a second illuminated end. A first electrode and a second electrode feed from opposite ends of the metal halide lamp 12. The light source 12, however, can comprise an electrodeless lamp or any conventional means for emitting light. This 575 watt light source 12 is reflected by the quad reflector 14, as illustrated by the lines of incidence shown in FIG. 1a, in four different directions, and is then directed through an angle of approximately 90 degrees (or any other desired angle) by each of four flat reflectors or fold mirrors.

FIG. 1a illustrates three fold mirrors 24, 24a, and 24b corresponding to the three reflectors 16, 18, and 19, respectively. Only three fold mirrors 24, 24a, and 24b are illustrated in FIG. 1a, but up to four fold mirrors may be implemented, one corresponding to each of the reflector portions 16–19. The fold mirrors function to reflect heat generated by the light source 12 and are thus advantageous when a hot light source 12 is used. The presently preferred embodiment, as shown in FIG. 1b, is a linear configuration which incorporates neither fold mirrors nor mixing rods. Ultra-violet (UV) and/or infrared (IR) radiation blocking coatings may be placed on the exit lens faces 32, and are preferred when the fold mirrors 24 are not used. As an alternative to the lens face 32 coatings, hot mirrors 24' (FIG. 1b) may be used for reflecting UV and IR radiation. These hot mirrors 24' may be placed at any stage between the light source and the output light guides and, further, may be placed at perpendicular or off-axis orientations. Each focussed beam of light impinges on a lens end of a respective one of the circular mixing rods 28, 28a, 28b, and 28c. Each of the four circular mixing rods 28, 28a, 28b, and 28c comprises a transparent material, such as glass or clear plastic, and is adapted to integrate the light beam by means of multiple reflections within the mixing rod. The mixing rods may be omitted in an alternatiave embodiment of the present invention.

Figure 3:
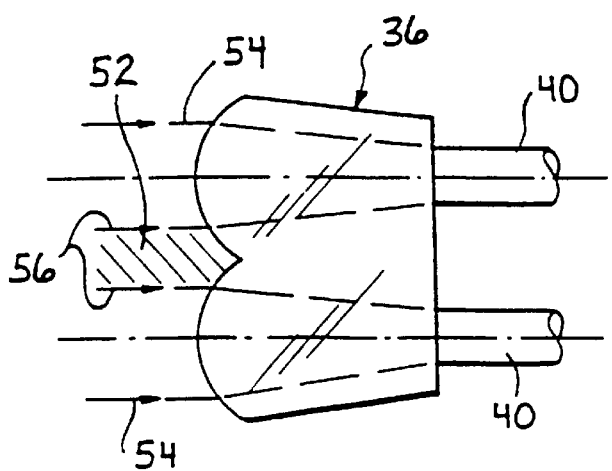
Figure 4:
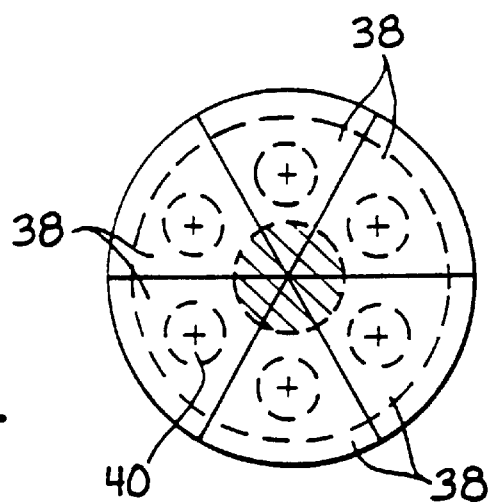
FIG. 4 is an end view of the multi-sector lens shown in FIG. 3.

On the right side of the system, or right channel 30, as illustrated in FIG. 1a, the light beam emerges from the mixing rod 28 at the exit lens face 32. The diverging beam from the mixing rod 28 is then focussed and split into a number of separate focussed beams by means of a multi-sectored lens 36 (FIGS. 1a, 3 and 4). Each of the lens sectors 38 (FIG. 4) focusses light onto the core of a corresponding output light guide 40.

When an electrodeless lamp or a very high lumen output lamp is used, the light guides preferably comprise fibers which are rated for the proper lumen output. For high-lumen output cases, the fibers will often comprise a non-plastic material.

In a conventional optical design, a focussing lens would likely be required between the circular mixing rod 28 and the multi-sectored lens 36. The multi-sectored lens 36 of the present invention, however, is modified over conventional lenses to obviate any need for a focussing lens. For example, the multi-sectored lens 36 is larger than would be required with a conventional focussing lens between the multi-sectored lens 36 and the circular mixing rod 28. Alternatively, a conventional focussing lens may be used with the multi-sectioned lens 36.

The optical system for the top beam of FIG. 1a focussed by the quad reflector 14 through the top channel 31 is essentially the same as that of the right channel 30. The optical system for the left beam focussed by the quad reflector 14 through the left channel 42 can be essentially the same as that described with respect to the right channel 30 or, alternatively, different features may be incorporated into the left channel 42. For example, the right channel 30 or the top channel 31 may have a sector lens accommodating ten output light guides, while the left channel 42 may only couple to a single large light guide or multi-light guide bundle 44. Different features, including combinations of the features illustrated within the right channel 30, the top channel 31, and the left channel 42, may be incorporated and used with any of these channels, in various combinations. Additionally, combinations of these features may be used with the bottom channel 43. The bottom channel 43 is shown with a focussing lens 45c and without a fold mirror. As in the presently preferred embodiment of FIG. 1b, the focussing lens 45c of FIG. 1a focusses light from the second reflector portion 17 to the circular mixing rod 28c. The focussing lens 45c may be used instead of, or in addition to, any of the fold mirrors 24, 24a, and 24b in the right, left, and top channels 30, 42, and 31, respectively, according to design parameters.

According to the presently preferred embodiment of FIG. 1b, which implements a 575 watt metal halide lamp, the fold mirrors are not used in the FIG. 1a configuration and light from the four reflector portions 16–19 is focussed directly into mixing rods and, subsequently, focussed into either lenses or segmented lenses.

As illustrated in FIG. 1a, a rotating color wheel 46 is disposed at the exit of the mixing rod 28 or, alternatively, in front of the sector lens 36. With the color wheel 46 at the mixing rod exit, the color of the light to all of the light guides is the same and changes simultaneously as the wheel rotates. With the wheel near the entrance to the sector lens 36, the colors to each light guide are different and can change at different rates depending on the pattern of the wheel. These various color controls are useful in pool lighting, signs, and other applications.

The high efficiency of this illumination system derives from the special design of a number of its elements working alone and in combination. When an electrodeless lamp is not used, the light source 12 is preferably selected to have small arc dimensions so that it will couple into light guides of relatively small diameter (preferably 3 mm to 10 mm). The quad-curved reflector 14 consists of four axially symmetrical curved halves or portions 16–19, with the light source 12 centered at their matching plane. This arrangement makes use of the very efficient collection properties of the low magnification section of the ellipsoidal (or near ellipsoidal) reflector shape. A large hole 48 in the center of each of the four reflector portions 16–19 results in a focussed light beam with a ring-shaped cross section. Light entering the hole in each reflector portion is not lost but passes into the opposite reflector portion and is focussed into the second focussed beam. This reflector arrangement efficiently generates a ring cross-section beam which is very useful in reducing the radial aperture required of each of the sector lenses 38 (FIG. 4).

Figure 2:
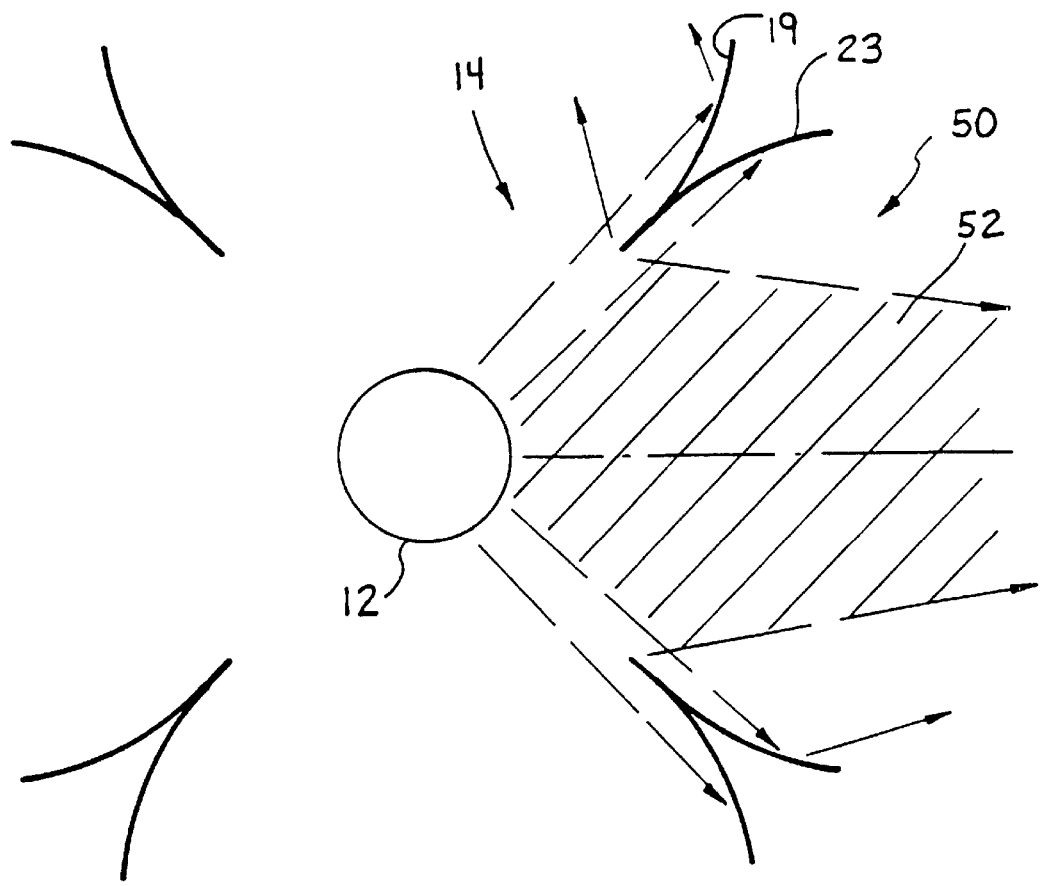

FIG. 2 shows a section through the right portion of the quad-reflector 14 indicating how the ring-shaped beam 50 is generated. The ring-shaped beam 50, wherein the darkened center portion 52 is represented by cross-hatching, is preserved through the mixing rod 28.

As best shown in FIG. 3, the ring-shaped beam impinges on the sector lens 36 as well, and it can be seen that the outer boundary 54 of the beam 50 and the inner boundary 56 thereof, define the lens aperture in the radial direction. The ring beam thus very usefully limits the required lens aperture and permits lenses of relatively short focal length to be used. This ability to use short focal length lenses permits much more efficient coupling into small diameter light guides, thus unexpectedly increasing the efficiency of the system. The minimum light guide diameter is controlled by the need to match the output beam divergence to the numerical aperture of the light guide.

Another feature of the present invention is the orientation of the light source 12. As illustrated particularly in FIG. 2, the light source 12 is shown at the focal point of the dual reflector 14. The long dimension of the arc discharge of the light source 12 is oriented so as to be substantially parallel and coincident with a reflector symmetry axis, which passes through the light source 12 and which is perpendicular to the page on which FIG. 2 is printed. Small output light guide diameter is usually desired in most applications. A design for a small light guide will also in general provide efficient coupling to larger light guides provided the numerical aperture of the larger fiber is the same or larger than the smaller fiber. In the presently preferred embodiment, the output light guide core diameter is nominally one half inch. This large diameter is required because the high output power of the light source may burn smaller light guides. Additionally, the sector lens of the present invention, which obviates any need for a focussing lens, has an aspheric shape that can be specified using standard optical equations.

Although six equal lens sectors 38 are illustrated in FIG. 4, the sector lens 36 can have as few as two and up to about twelve or more sectors. Also, the sectors need not be equal in area, since in some applications it may be desirable to deliver different amounts of light to different locations. The sector lens as a means of splitting the incident beam has a major advantage over currently used bundled light guides in that the sector lens array separates the light guides from each other (FIGS. 3 and 4), thereby permitting easy installation and removal of individual light guides.

As previously mentioned, the fold reflectors 24, 24a, and 24b may serve a multiple function of both folding mirror and heat rejecting mirror. As a folding mirror, they may be used with or without a hot light source 12, and provide the ability of rotating the entire output optical system around mechanical axes 64 and 64a, as best shown in FIG. 1a. This feature is very useful in allowing great flexibility in positioning the direction in which the light guides emerge from the unit. Independent rotation of the fold mirrors 24 and 24a, for example, on either side of the light source 12 provides additional flexibility of output light guide location.

As described above, the circular mixing rod 28 (as well as mixing rods 28a, 28b, and 28c) is used to integrate the angular distribution of the light around the rod axis 66. This is advantageous since it allows the light output of each light guide to be identical (which is usually desired), because the angular light distribution from the light source 12 is not generally uniform. Additionally, a metal-halide type of arc lamp, which may be used, typically has some color differences in the angular distribution which also need to be integrated out in order to avoid undesirable color differences in output between light guides. A field lens 32, for example, is preferably employed on each of the mixing rod ends to constrain the light inside the rod so that it is totally reflected internally. Mechanically, the field lens portion 32 of the mixing rod 28 is larger in diameter than the rod section itself in order to provide a loss-free means of mounting the mixing rod 28. Anything touching the mixing rod surface will bleed off some of the internally reflected light unless the rod is clad, which is a disadvantageous approach since it reduces its numerical aperture and increases its cost. Each mixing rod may be coated with a low-index material, according to one embodiment of the present invention.

The individual lens sectors 38 (FIG. 4) comprise a relay lens system that roughly images the output end of the mixing rod onto the light guide port. The lens sectors may have aspheric shapes to reduce aberrations and improve efficiency, and are preferably given a thickness such that the output beam is focussed on the flat rear surface of the lens sector. This allows the soft core of the usual type of light guide to "wet" the lens surface, thereby reducing reflection losses at this interface. In another embodiment of the present invention, air gaps can be maintained between the light guides 40 and the lens sector 38 surfaces.

The quad-curved reflector 14 illustrated in FIG. 1a may be expanded or reduced to add more or less curved reflectors. For example, three curved reflectors or eight curved reflectors may be embodied, instead of four curved reflectors. The number of curved reflectors (ports) will be dependent upon the particular system requirements. Each curved reflector, corresponding to a port, is independent of the other ports and, accordingly, can be coupled to one or several light guides, mixing rods, or light guides. The largest number of curved reflectors, or ports, will often be determined by the size limitations of the focussing optics, such as the focussing lenses, for example.

The étendue or Lagrange invariant is a quantity of a beam of light that is an invariant through an optical system. The étendue can be defined in several different ways which must be discerned by the context. The simplest definition is based on rays of light from a far distant object subtending an angle of 2 θ at a circular aperture of radius a. According to the paraxial approximation, the étendue is denoted by θa. If the circular aperture is the input to an optical system, and if there are no obstructions to the beam in the system and absorption and scattering etc. are ignored, then the étendue quantity is invariant through the system.

The square of the quantity θa is $\theta^2 a^2$. This squared quantity is also invariant through the system and is often referred to as the three dimensional étendue. This three dimensional form of the étendue is useful because it is proportional to the power flow through the system.

In non-imaging applications (including fiber optic and light guide illuminators) the paraxial approximation is not valid and the more general definition of étendue must be used. This more general definition is stated in terms of small displacements of a ray of light propagating from a point P(x,y,z) in an input medium of index n to a point P'(x',y',z') in an output medium of index n'. The direction cosine at point P is indicated as (L,M,N) and the direction cosine at point P' is indicated as (L',M',N'). Small displacements of the ray of light at point P are indicated by dx and dy with corresponding changes dx' and dy' at point P' and, similarly, small changes in the direction cosines are indicated by dL, dM, dL', and dM'. With these definitions the étendue invariant relationship is given by:

$$n'^2 \, dx' \, dy' \, dL' \, dM' = n^2 \, dx \, dy \, dL \, dM$$

where L and M correspond to the direction cosines for the x and y axes, respectively.

Applying this result to the first definition of étendue given above, it can be determined that the étendue is proportional to $a^2 \sin^2\theta = a^2 NA^2$ where NA is the numerical aperture. In this result constant factors are dropped and the refractive index is assumed to be identical at both points. The general definition allows one to compute the étendue for arbitrary situations if the integrals can be evaluated.

The use of three dimensional reflectors, such as conic or parabola-like surfaces of revolution, to collect light from a noncoherent light source and launch it into light guides is inefficient, since it apparently violates the fundamental principal described by the étendue invariant. A reflector is typically in close proximity to a light source, with the light source being disposed at a focal point of the reflector, and the reflector subtends a large solid angle resulting in a large value for the étendue invariant. In contrast, a light guide has a relatively small opening (core diameter) with a limited numerical aperture resulting in a small value for the étendue.

An annular ring of lenses can significantly increase the efficiency of collecting light from an incoherent light source, since the annular ring of lenses reduces the dependence on the reflector shape in a manner that is consistent with the principles of étendue. The role of the reflector is to collect the light that is propagating above or below the ring of lenses, and to redirect the light onto the lenses and into the light guides. The lenses can be configured in a single row or several rows, or can be configured in a pattern of shapes required for a particular application.

The constraints in a particular configuration are the size and shape of the optical light source, and the size and numerical aperture of the light guides. The variables are the number of lenses, which determines the number of light guides, and the lens powers. The reflector consists of two parts, a top and a bottom. The shape of the reflector as viewed by a radial cut will have a parabola or ellipse-shaped surface. As presently preferred, the shape is further modified by computer simulation and empirical data collection, to maximize the amount of light reflected from the light source into the lenses. As the number of lenses increases, the size of the reflectors will in general decrease, since a larger solid angle of the light source will be subtended by the lenses. The design is constrained first by the image size which is determined by the size of the light guide core. This fixes the magnification. With a given magnification, the maximum lens size is constrained by the light guide numerical aperture. This in turn determines the minimum number of lenses (and light guides) that can be used. A larger number of smaller lenses can always be used, because the angular extent of the light will be less than the light guide numerical aperture.

Figure 5:
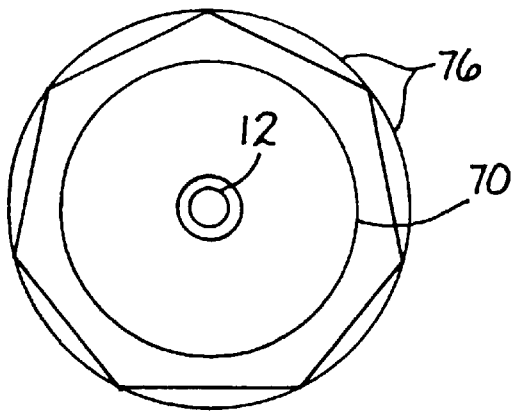
FIG. 5 is a top planar view of an optical system according to one embodiment of the present invention.
Figure 6:
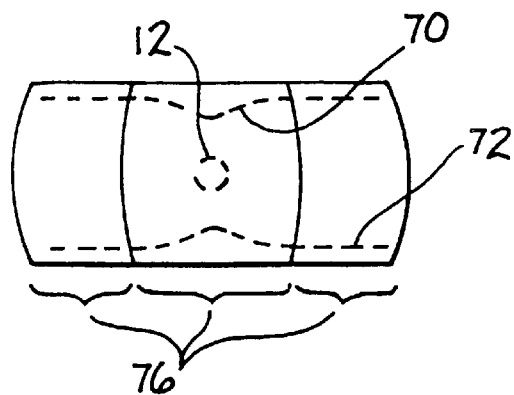
FIG. 6 is a side planar view of the optical system shown in FIG. 5.
Figure 7:
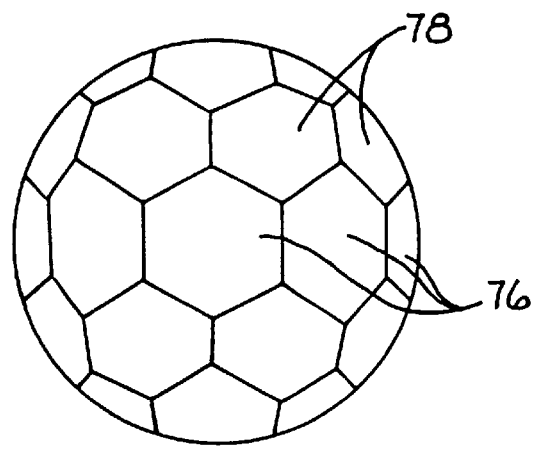
FIG. 7 is a side planar view of a ring of lenses according to another embodiment of the present invention.

FIGS. 5–7 illustrate an embodiment comprising two reflectors 70, 72 positioned above and below the light source 12. The curvature of the curved reflectors 70, 72 may be computer generated and empirically tested to maximize reflections from the light source 12. As illustrated in the top planar view of FIG. 5, the top curved reflector 70 comprises a disc shape, as does the bottom reflector 72 (FIG. 6). The light source 12 in this embodiment preferably comprises a metal-halide type of arc lamp, since the full power of a Solar 1000™ sulfur lamp may not be desired. Seven focussing or transfer lenses 76 are shown surrounding the light source 12. Since the top reflector 70 and the bottom reflector 72 in the embodiment of FIGS. 5–7 can accommodate, ideally, an infinite number of ports, a larger or smaller number of transfer lenses 76 may be implemented, according to the number of ports desired. FIG. 6 illustrates a side planar view of the optical system shown in FIG. 5. The transfer lenses 76 extend a height, which is approximately equal to a height between the top curved reflector 70 and the bottom curved reflector 72. The transfer lenses 76 basically form a ring of lenses around a perimeter of the top curved reflector 70 and the bottom curved reflector 72. The top curved reflector 70 and the bottom curved reflector 72 direct the higher angle light from the light source 12 to the transfer lenses 76.

As illustrated in FIG. 7, instead of the single ring of lenses shown in FIGS. 5 and 6, additional lenses 78 may be added along a vertical height of the ring of lenses, in addition to along the circumference of the ring of lenses. As with all of the embodiments of the present invention, sector lenses 36 and output light guides 40 (FIG. 1a), as well as other optical elements and combinations thereof, may be used. Any arrangement of large lenses 76 and small lenses 78 may be configured along the height and circumference of the ring of lenses, according to design preference. Additionally, the circumference of the ring of lenses may be increased or decreased, as can the height of the ring of lenses.

As the height of the ring of lenses is increased, the ring of lenses will approach a sphere of lenses, completely surrounding the light source 12. When a sphere of lenses is used, the top curved reflector 70 and the bottom curved reflector 72 may no longer be necessary. As the assembly approaches a sphere of lenses, the assembly also approaches 100% efficiency. A ring of lenses, such as shown in FIGS. 5–7, however, may be easier to manufacture. As presently embodied, the lenses comprise glass, but other materials may be used. Reflectors, corresponding to the fold mirrors 24, 24a, and 24b, may be implemented in these embodiments as well.

Figure 8:
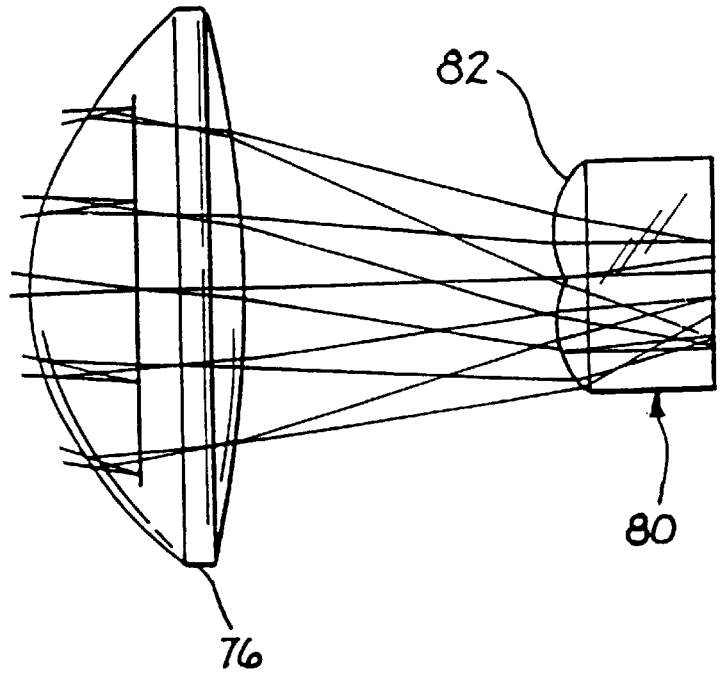
FIG. 8 is a schematic view of a transfer lens and a condenser lens, according to the presently preferred embodiment.

The focussing or transfer lenses 76 each preferably function to transfer light to a condenser lens 80, as illustrated in FIG. 8, though alternatively, they could be adapted to focus light directly onto a mixing rod or output light guide, such as an optical fiber. A condenser lens 80 can be coupled to each transfer lens 76. The number of condenser lenses may be increased or decreased to increase or decrease the total number of ports in the system, depending upon preference. The maximum number of condenser lenses is limited by the number of transfer lenses.

The relatively consistent distribution of light over the surface area of the input end of the light guide can be generally attributed to the shape of the condenser lenses 80. Each of the transfer lenses 76 is preferably configured to transmit an approximately equal amount of light from the light source onto a corresponding condenser lens 80. More particularly, each of the presently preferred condenser lenses 80 has a double-curved surface 82 that facilitates a relatiavely consistent distribution of light over the surface area of the input end of the light guide.

Although exemplary embodiments of the invention have been shown and described, many other changes, modifications and substitutions, in addition to those set forth in the above paragraphs, may be made by one having ordinary skill in the art without necessarily departing from the spirit and scope of this invention.

We claim:

1. An illumination system, comprising:
   a first curved reflector having a generally circular perimeter generally lying in a first plane;
   a second curved reflector having a generally circular perimeter generally lying in a second plane, which is substantially parallel to the first plane; and
   a light source disposed between the first curved reflector and the second curved reflector.

2. The illumination system as recited in claim 1, the light source comprising a metal halide lamp.

3. The illumination system as recited in claim 1, the light source comprising a 575 watt bulb.

4. An illumination system, comprising:
   a first curved reflector generally lying in a first plane;
   a second curved reflector generally lying in a second plane, which is substantially parallel to the first plane;
   a light source disposed between the first curved reflector and the second curved reflector; and
   a plurality of focussing lenses disposed around the first curved reflector and the second curved reflector.

5. The illumination system as recited in claim 4, the first curved reflector having a generally circular perimeter, and
   the second curved reflector having a generally circular perimeter.

6. The illumination system as recited in claim 1, the first curved reflector having an approximately planar shape with a slight curvature, and
   the second curved reflector having an approximately planar shape with a slight curvature.

7. The illumination system as recited in claim 1, further comprising a plurality of focussing lenses disposed around the first curved reflector and the second curved reflector.

8. The illumination system as recited in claim 7, the plurality of focussing lenses comprising a ring of focussing lenses, each of the focussing lenses being adapted for focussing light from both the light source and the curved reflectors in a generally radially outwardly direction from the light source.

9. The illumination system as recited in claim 8, the ring of focussing lenses having a height, measured along an axis connecting the first curved reflector to the second curved reflector, and having a perimeter, and
   the ring of focussing lenses having a plurality of focussing lenses, measured along the axis, at any point along the perimeter.

10. An illumination system, comprising:
    a metal halide lamp for emitting light; and
    a ring of focussing lenses disposed around the metal halide lamp, each of the focussing lenses being adapted for focussing emitted light from the metal halide lamp in a generally radially outwardly direction from the metal halide lamp.

11. The illumination system as recited in claim 10, the ring of focussing lenses having a height and a perimeter, and
    the ring of focussing lenses having a plurality of focussing lenses, measured along the height, at any point along the perimeter.

12. An illumination system, comprising:
    a first curved reflector generally lying in a first plane;
    a second curved reflector generally lying in a second plane, which is substantially parallel to the first plane; and
    a metal halide lamp disposed between the first curved reflector and the second curved reflector.

13. An illumination system, comprising:
    a first curved reflector generally lying in a first plane;
    a second curved reflector generally lying in a second plane, which is substantially parallel to the first plane; and
    a 575 watt bulb disposed between the first curved reflector and the second curved reflector.

14. The illumination system as recited in claim 4, wherein the plurality of focussing lenses comprises a ring of focussing lenses, each of the focussing lenses being adapted for focussing light from both the light source and the curved reflectors in a generally radially outward direction from the light source.

15. The illumination system as recited in claim 14, wherein the ring of focussing lenses has a height, measured along an axis connecting the first curved reflector to the second curved reflector, and a perimeter;

the ring of focussing lenses comprising a plurality of focussing lenses disposed heightwise in the direction of said axis, at any point along the perimeter.

16. The illumination system as recited in claim 4, and further comprising a plurality of optical fibers disposed outwardly of said focussing lenses, wherein the number of optical fibers corresponds to the number of focussing lenses and each focussing lens is adapted to focus light emitted therefrom onto an input end of a corresponding one of said optical fibers.

* * * * *